United States Patent
Purushothaman et al.

(10) Patent No.: US 9,832,184 B2
(45) Date of Patent: Nov. 28, 2017

(54) CONTROLS AND ADMINISTRATION OF PRIVILEGED ACCOUNTS SYSTEM

(71) Applicant: Bank of America Corporation, Charlotte, NC (US)

(72) Inventors: Sasidhar Purushothaman, Hyderabad (IN); Ramakrishna Gaddam, Secunderabad (IN); Rajamanimaran Krishnamoorthy, Kancheepuram (IN); Surya Kiran Koduru, Hyderabad (IN); Santosh Kothuru, Hyderabad (IN); Santhosh Kurimilla, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 147 days.

(21) Appl. No.: 14/969,030

(22) Filed: Dec. 15, 2015

(65) Prior Publication Data
US 2017/0171186 A1 Jun. 15, 2017

(51) Int. Cl.
*H04L 29/06* (2006.01)

(52) U.S. Cl.
CPC .......... *H04L 63/083* (2013.01); *H04L 63/102* (2013.01); *H04L 63/104* (2013.01); *H04L 63/1416* (2013.01); *H04L 63/1425* (2013.01)

(58) Field of Classification Search
CPC .............. H04L 63/083; H04L 63/1425; H04L 63/1416; H04L 63/104; H04L 63/102
See application file for complete search history.

(56) References Cited

U.S. PATENT DOCUMENTS

| | | | | |
|---|---|---|---|---|
| 6,308,273 | B1 * | 10/2001 | Goertzel | G06F 21/6218 726/2 |
| 6,976,078 | B1 * | 12/2005 | Icken | G06F 21/6227 709/229 |
| 7,350,226 | B2 | 3/2008 | Moriconi et al. | |
| 7,376,838 | B2 * | 5/2008 | Narayanan | G06F 21/31 705/40 |
| 8,388,440 | B2 | 3/2013 | Patterson | |
| 8,631,477 | B2 | 1/2014 | Chen et al. | |
| 8,862,551 | B2 | 10/2014 | Lim | |

(Continued)

OTHER PUBLICATIONS

"So What Is Active Directory," Retrieved on Nov. 10, 2015, Microsoft, Redmond, Washington.

*Primary Examiner* — Mahfuzur Rahman
(74) *Attorney, Agent, or Firm* — Weiss & Arons LLP; Michael A. Springs, Esq.

(57) ABSTRACT

Apparatus and methods for enhancing group access accountability are provided. The method may include receiving a request from a user to access a system and user-identifying information associated with the user. The method may also include querying a database to retrieve a group ID number associated with at least a portion of the user-identifying information and access permissions associated with the group ID number. The method may further include querying a database to retrieve a user ID and password associated with the group ID number. The user ID and password may be selected from a group of usernames and passwords associated with the group ID number. The method may additionally include flagging the user ID and password with a flag, the flag indicating that the user ID and password are in use, and transmitting the user ID and password to the user.

9 Claims, 5 Drawing Sheets

(56) References Cited

U.S. PATENT DOCUMENTS 8,868,607 B2 10/2014 Apsel
2004/0031856 A1* 2/2004 Atsmon .................. G06F 21/34
235/492

* cited by examiner

CONTROLS AND ADMINISTRATION OF PRIVILEGED ACCOUNTS SYSTEM

FIELD OF TECHNOLOGY

Aspects of the disclosure relate to providing apparatus and methods for enhancing computer security. In particular, the disclosure relates to apparatus and methods for generating unique user-identification passwords for user log-in.

BACKGROUND

System managers are challenged with establishing and maintaining the security of their systems. Security threats to such a system may include an outsider accessing the system without permission. Security threats also include an insider abusing his access privileges. Therefore, being able to track a user's transactions on a system is vital to maintaining system security.

Many systems provide a group of users with a single user password. The group of users may be a team of information technology ("IT") employees. Providing the team with a single password ensures that the team has been given equal system access.

A single password shared among users is not desirable from a security perspective. This is at least because the user password may be inadvertently or purposefully shared with an employee who is not part of the team. Additionally, when a team of users accesses a system using the same password, it becomes almost impossible for a system administrator to identify which system transactions were executed by which team member. The inability to track a user's behavior within the system creates a serious security risk by allowing employees to access the system without being accountable for their system usage.

It would be desirable, therefore, to provide apparatus and methods for granting a team of users equivalent access to a system while simultaneously identifying and tracking each user's system usage.

SUMMARY OF THE DISCLOSURE

Systems and methods are provided for enhancing computer security. The method may include an article of manufacture comprising a computer usable medium having computer readable program code embodied therein for enhancing group access accountability. The computer readable program code in said article of manufacture may comprise computer readable program code for receiving a request from a user to access a system and user-identifying information associated with the user. The computer readable program code may also be for querying a database to retrieve a group ID number associated with at least a portion of the user-identifying information and access permissions associated with the group ID number. The computer readable program code may additionally be for querying a database to retrieve a user ID and password associated with the group ID number, the user ID and password being selected from a group of usernames and passwords associated with the group ID number. The computer readable program code may additionally be for flagging the user ID and password with a flag, the flag indicating that the user ID and password are in use.

The computer readable program code may additionally be for transmitting the user ID and password to the user. The computer readable program code may also be for, after receiving log-in information including the user ID and password, storing all transactions executed by the user ID in a log, the log being associated with the user-identifying information. The computer readable program code may further be for continuously comparing the transactions to the access permissions associated with the group ID number. The computer readable program code may additionally be for receiving a log-out request from the user ID. The computer readable program code may additionally be for deleting the flag from the user ID and password.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Apparatus and methods for enhancing computer security are provided. Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
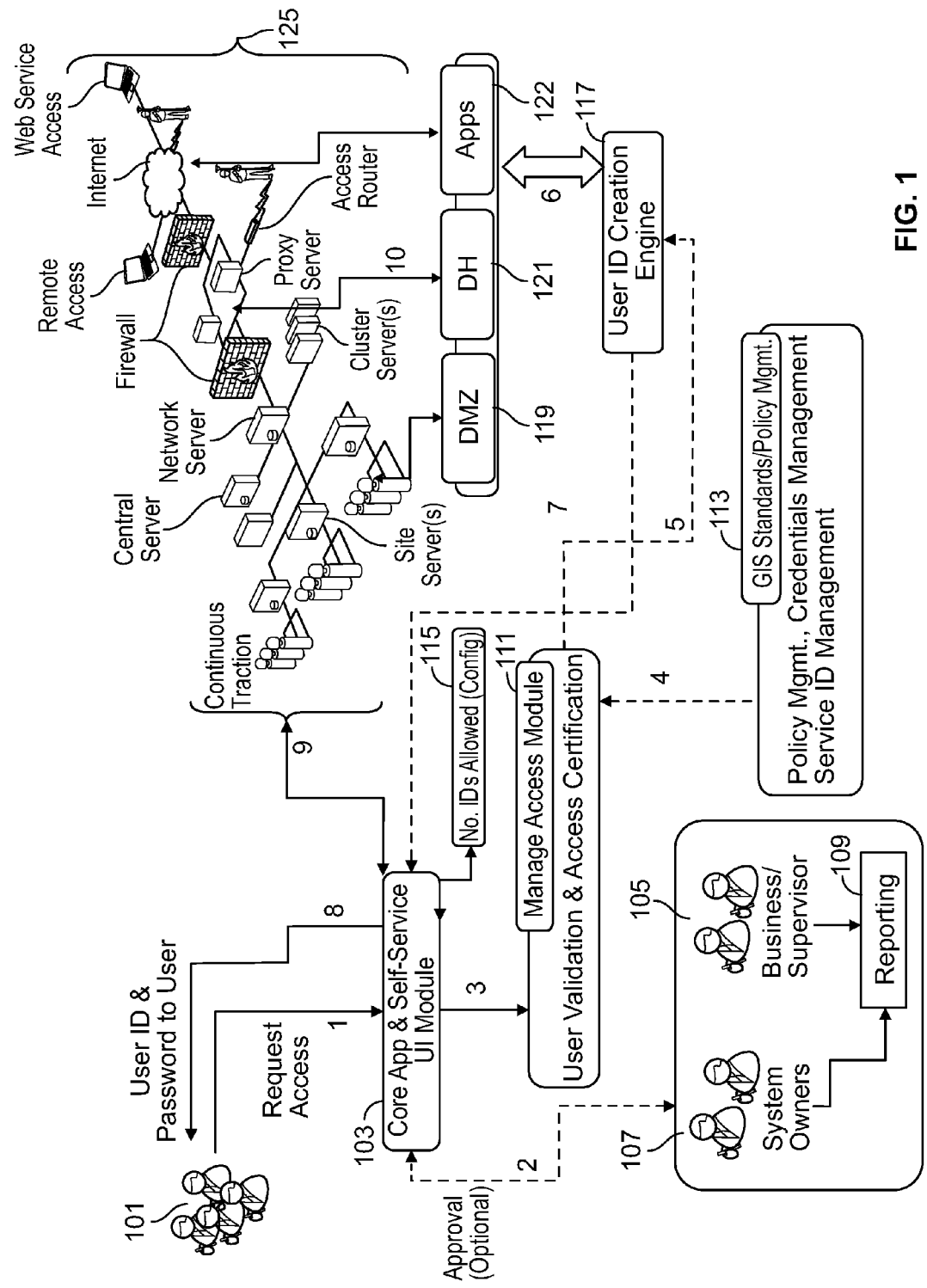
FIG. 1 shows a process and apparatus in accordance with the invention.
Figure 2:
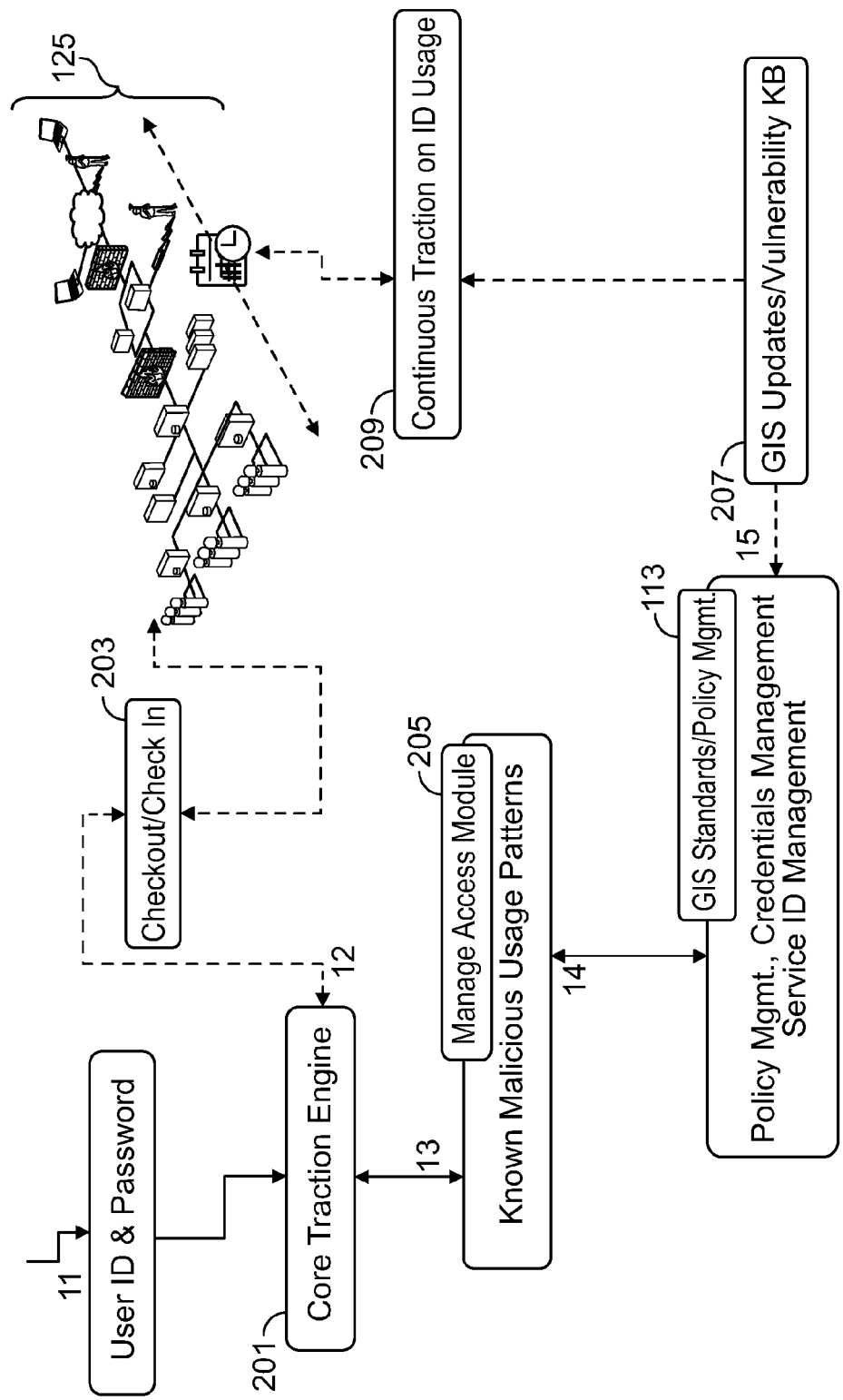
FIG. 2 shows another process and apparatus in accordance with the invention.

FIG. 1 illustrates an exemplary process and apparatus that may be used in accordance with the systems and methods of the invention.

The exemplary process may begin at step 1. At step 1, a user may request access to a system. The system may include one or more applications, databases, servers, firewalls, networks, or any other suitable hardware, firmware or software. Some or all of the system may be represented in FIG. 1 as system 125.

The user request may include inputting user-identifying information. Exemplary user-identifying information may include one or more of a user name, user identification number, user team number, user social security number, user address, or any other suitable identifying information.

In some embodiments, the user request may include a request to access a shared user account. An exemplary shared user account may include an account associated with a group of employees, such as a team of IT employees.

In some embodiments, the user access request may detail to which hardware, firmware or software the user requests access. In some embodiments, the user access request may also detail to which one of the seven layers defined by the Open Systems Interconnection model (OSI model) the user requests access. The seven layers may include the physical layer, data link layer, network layer, transport layer, session layer, presentation layer and the application layer The user access request may be input into core application and self-service user interface ("UI") module 103 (hereinafter, "core module 103"). Core module 103 may include one or more graphical user interfaces ("GUIs"). A user may access a GUI generated by core module 103 to request system access.

In some embodiments, step 2 may be optional. Step 2 may include transmitting a request for approval to one or more system owners 107 and/or business supervisors 105. In some of these embodiments, at least one of the one or more system owners 107 and/or business supervisors 105 may be required to approve the request for system access prior to the process continuing at step 3.

At step 3, core module 103 may transmit the user request to manage access module 111. Manage access module 111 may execute user validation and access certification. For example, manage access module 111 may retrieve at least a portion of the user-identifying information input into core module 103 and determine whether or not the information identifies a user authorized to access the system. In the embodiments wherein the user identifies the system access he desires, manage access module 111 may compare the requested access to authorized access associated with the user in a database. In some embodiments, manage access module 111 may retrieve from a database authorized system access associated with at least a portion of the input user-identifying information.

The exemplary process illustrated in FIG. 1 may include step 4. At step 4, geographic information system ("GIS") standards/policy management 113 may be in electronic communication with manage access module 111. GIS standards/policy management 113 may include a user interface. The user interface may be accessed by one or more authorized personnel. Exemplary authorized personnel include system owners, business supervisors, managers and key stake holders.

The user interface may be used by authorized personnel to create, modify and/or delete authorized system users. The user interface may be used by authorized personnel to create, modify and/or delete permissions associated with each of the authorized system users. In some embodiments, the permissions may define one or more servers, applications, databases, networks, and/or firewalls that a user can access. The permissions may also define one or more layers of the OSI model that the user is authorized to access for each of the hardware, software or firmware that the user is permitted to access.

In some embodiments, the user interface may be used to create one or more teams. A user of the user interface may assign two or more users of each of the teams. The user may then input into the user interface authorized permissions associated with each of the teams. The authorized permission may include the accesses described above. In some embodiments, each team may be associated with the same access permissions. In some embodiments, each team may be associated with different access permissions.

Data input into the GUI displayed by GIS standards/policy management 113 may be stored in one or more databases. For example, the permissions of authorized system users may be stored in one or more databases, such as a permissions database. GIS standards/policy management 113 may output one or more displays of data stored in the one or more databases. For example, GIS standards/policy management 113 may display aspects of user permissions granted to one or more users or team(s) of users in the one or more databases in a map-like form.

The one or more permissions databases may be accessed by manage access module 111. Manage access module 111 may request or pull data from the permissions database(s). Manage access module 111 may request or pull data from the one or more permissions database(s) in order to validate whether or not a user has permission to access the system and/or to identify which access permissions the user has within the system.

In some embodiments, no. IDs Allowed 115 may limit a number of users that can simultaneously access certain permissions within the system. For example, no. IDs allowed 115 may define a maximum number of users authorized to access a resource at any given time. The number of users may be configurable. In some embodiments, the criticality of a resource for which access is being requested may be taken into consideration when a number of users is defined. For the purposes of this application, a resource may be one or more layers of the OSI model of any server, application, database, network, and/or firewall.

If manage access module 111 pulls from a permissions database a resource that the user is authorized to access, manage access module 111 may subsequently check no. IDs allowed 115 to ascertain if a maximum number of authorized users currently accessing the resource has already been reached. If the maximum number of authorized users has been reached, manage access module 111 may deny the user access to the system.

The process illustrated in FIG. 1 may include step 5. At step 5, manage access module 111 may validate a user's identity. At step 5, manage access module 111 may also retrieve user access granted to the user. For example, manage access module 111 may pull user access permission from the permissions database(s) accessed through GIS standards/policy management 113 user interface(s).

If a user has been verified to the system, manage access module 111 may transmit the user's identity and the user's retrieved authorized access to user identification ("ID") engine 117. The transmission may include a request to create a user ID for the user.

In the event that manage access module 111 is unable to validate a user, at least because the user's identifying information is not stored in the permissions database, or a hold has been put on the user's authorized access to the server within the permissions database, the process may terminate at step 5. If a user has not been validated, step 5 may not include transmitting a request to user ID creation engine 117 for creating a user ID for the user.

For validated users, the illustrative process may include step 6. At step 6, user ID creation engine 117 may transmit a request to application 112 to create or select a user ID and password for the user. The request transmitted to application 112 may include user-identifying information. For example, the request may include at least a portion of the user identification information input by the user at step 1; when the user was requesting access to the system. The request transmitted to application 112 may also include user permissions associated with the user in the permissions database. In some embodiments, the request transmitted to application 112 may also include a team identification number associated with the user in the permissions database.

In response to the request, application 112 may generate a user ID and password for the user. Application 112 may subsequently transmit the generated user ID and password to user ID creation engine 117.

In some embodiments, application 112 may be in electronic communication with data highway ("DH") 121 and/or demilitarized zone ("DMZ") 119. Application 112, DH 121 and DMZ 119 may form at least a portion of system 125. System 125 may illustrate at least a portion of the software utilized by the invention to generate or select user IDs and passwords for users trying to access the system. In some embodiments, system 125 may also illustrate at least a portion of the system that the user is attempting to access.

In some embodiments, application 112 may dynamically generate a unique user ID for each user in response to a request from user ID creation engine 117. In some embodiments, a dynamically-generated user ID and/or password may be stored in an access database prior to transmitting the user ID and/or password back to user ID creation engine 117.

The dynamically-generated user ID may be stored in the access database together with user-identifying information identifying the user for whom the ID was created. The ID may also be stored with access permissions, such as access permissions assigned to the user in the permissions database. The access permissions may define one or more networks, databases, firewalls, servers, applications, or any other suitable hardware, software and/or firmware that the user has authorized access to. The access permissions may also define which OSI layer of the networks, databases, firewalls, servers, etc. that the user has authorized access to. Application 112 may retrieve the access permissions from the permissions databases. Application 112 may receive the access permission from user ID creation engine 117.

In some embodiments, application 112 may check out an existing user ID for the user in response to the request from user ID creation engine 117. The checked out user ID may be associated with a group. The group may be a group of employees that includes the user. Application 112 may identify a group associated with the user by receiving a group ID from user ID creation engine 117 or by searching the permission database to determine if the user is part of a group.

In some embodiments, application 112 may create a group of passwords for each team of IT engineers or other business teams that will need access to the server. In some embodiments, application 112 may access a database that stores groups of passwords created for one or more teams of employees that will need to access the server. Each stored group of passwords may be associated with equivalent access privileges. Access privileges associated with each group of passwords may be the access privileges needed by the group to complete their assigned tasks. In some embodiments, the groups of passwords and/or access privileges associated with the groups of passwords may be stored in an access database.

After checking out an existing user ID from a group of passwords and transmitting the password to user ID creation engine 117, the password may be considered 'checked out.' Application 112 may check out a password by creating an entry in a database such as the access database, noting that the password has been checked out and is not available to the transmitted to user ID creation engine 117 at this time. For example, in some embodiments, application 112 may check out a password by flagging the user ID and password in a database. Flagging of the user ID and password may effectively block application 112 from checking out the flagged user ID and password until the flag is removed.

At set forth above, application 112 may determine whether or not a user is part of a user group when generating the user's user ID and password. In some embodiments, application 112 may use at least a portion of the user-identifying information input by the user into the GUI to identify a user group associated with the user. For example, at step 1, a user may input a user name or a user group number into core module 103. Core module 103 may transmit one or both of the user name and the user group number to manage access module 111. Manage access module 111 may transmit one or more both of the user name and the user group number to user ID creation engine 117, which may subsequently transmit one or both of the user name and user group number to application 112. Application 112 may use one or both of the user name and/or the user group number to identify a group of passwords. The identified group of passwords may be a group of passwords associated with one or more both of the user name and/or the user group number. Application 112 may then check out a user name and password from the identified group.

In some embodiments, if a user is determined to be part of a group, application 112 may check out, for the user, a pre-existing user ID and password. If the user is not determined to be part of the group, application 112 may instead dynamically generate a unique user ID and password for the user.

At step 7, user ID creation engine 117 may transmit the generated or checked out user ID and password to core module 103. User ID creation engine 117 may also transmit user-identifying information used to create the password to core module 103. In some embodiments, core module 103 and/or application 122 may store in a database the user ID, password, and associate user-identifying information with the stored user ID and password. This user-identifying information may be used by a system manager when he desires to link user ID transactions with the identity of the system user.

At step 8, core module 103 may transmit the user ID and password to user 101. For example, core module 103 may display the user ID and password on a GUI, transmit the user ID and password to the user's e-mail, send the user a text message to the user's cell phone number, or transmit the user ID and password to the user in any other suitable way.

Step 9 illustrates core module 103's functionality of continually or periodically tracking user ID usage in system 125. Different tracking functionalities are discussed at greater detail below, for example, with reference to step 13, step 14 and step 15.

Step 10 illustrates core module 103's ability to identify the allowed access permissions of a user and to restrict the user's access to the allowed access permissions. Access level restriction is discussed at greater detail below, for example, with reference to step 14.

At step 11, the user may input his user ID and password into core traction engine 201. Core traction engine 201 may represent one or more functionalities of core module 103. In some embodiments, core traction engine 201 may be part of core module 103. In some embodiments, core traction engine 201 may be in electronic communication with core module 103. In some embodiments, some functionalities of core traction engine 201 described below may be performed by core module 103. In some embodiments, all functionalities of core traction engine 201 described below may be performed by core module 103.

At step 12, after receipt of the user ID and password, core traction engine 201 may execute checkout/check-in procedure 203. At least a portion of checkout/check-in procedure 203 may include verifying the input user ID and password by accessing the access database and identifying the user ID and password in the access database. In the event that core traction engine 201 successfully verifies the information, core traction engine 201 may grant the user access to system 125.

At step 13, core module 103 may continually track the ID usage in the environment. For example, core traction engine may continually track the system usage of the user ID on system 125. The tracked data may be stored in a usage database. The stored, tracked data may be associated with one or more of the user ID and password, and/or user-identifying information associated with the user ID and password in the access database. In some embodiments, the tracked data may be stored as a log. The log may include every click and command that the user has executed on the system. The log may enable a team manager to review and audit each team member's system usage, providing enhanced visibility of system usage and accountability for each team member.

The tracking may include analyzing the log for known malicious usage patterns. For example, at step 13, manage access module 205 may compare logged data to known malicious usage patterns. In the event that logged data is substantially similar to, or identical to, one or more stored malicious usage patterns, the system may initiate one or more remedial routines. Exemplary remedial routines may include substantially immediately terminating the user ID's authorized access to the system, notifying one or more system administrators, initiating the display of one or more warning icons to the user, and/or any other suitable remedial routines.

In some embodiments, the malicious usage patterns may be input and stored in the permissions database by one of more system owners 107 and/or business supervisors 105. The tracking may include manage access module 205 comparing the logged data to the malicious usage patterns stored in the permissions database.

It should be noted that the permissions database, access database and usage database may be a single database or two or more databases. In some embodiments, each of the permissions database, access database and/or the usage database may be in electronic communication with each other and one or more of core module 103, user ID creation engine 117, manage access module 111, core traction engine 201, or any other module, system or engine described herein.

The tracking may additionally include comparing the system usage to access permissions associated with the user ID in the access database. For example, at step 14, GIS standards/policy management may compare logged data to the access permissions associated with the user's identifying information. In the event that the user attempts to access unauthorized data, the system may identify an attempted deviation from the access permissions and initiate one or more of the remedial routines described above.

In some embodiments, a portion of the tracking, or additional tracking, may be performed by GIS updates/vulnerability knowledge-based ("KB") 207. GIS updates/vulnerability KB 207 may track user activity in defined operating systems ("OS"), networks and/or other computing components that are classified as critical and/or high-impact to the system environment. This tracked behavior may be stored in constantly updated records and may be easily accessible for review by system managers.

In some embodiments, the tracking may include continually comparing the log to one or more defined usage patterns and looking for a deviation between the log and the usage patterns. For example, a first usage pattern may be defined for a generic account. The first usage pattern may define a technical workflow expected from users with authorized access to a generic account type. A second usage pattern may also be defined. The second usage pattern may define a technical workflow expected from users with access to a team account.

The system may retrieve a usage pattern for each user. In some embodiments, the usage pattern may be created by one or more of system owners 107 and/or business/supervisor 105, and stored in the permissions database. The tracking may include accessing a usage pattern associated with the user's identifying information in the permissions database. The user's log may then be continually compared to the retrieved usage pattern. In the event that a deviation greater than a predetermined deviation is identified, one or more types of remedial action such as the remedial action listed above may be initiated.

At step 209, the continuous tracking of ID usage within system 125 is represented. The continuous tracking includes the tracking functionalities described above.

At step 203, the user may log out of the system. After the user logs out, one of two actions may occur. If the user was using a randomly generated ID, the temporary ID number may either be deleted from the system or stored in a database and not generated again for a different user. The temporary ID may be made void and unusable for a different user after log out occurs.

If the user was using a 'checked out' user ID, the user ID creation engine may now 'check in' the user ID. For example, the user ID creation engine may remove the flag on the user ID and password, indicating that the user ID and password is now available to be used by another team member requesting access to system 125. Once an ID is 'checked in,' the ID may become disabled until the system 'checks out' the same ID at a later point in time to a different user.

Figure 3:
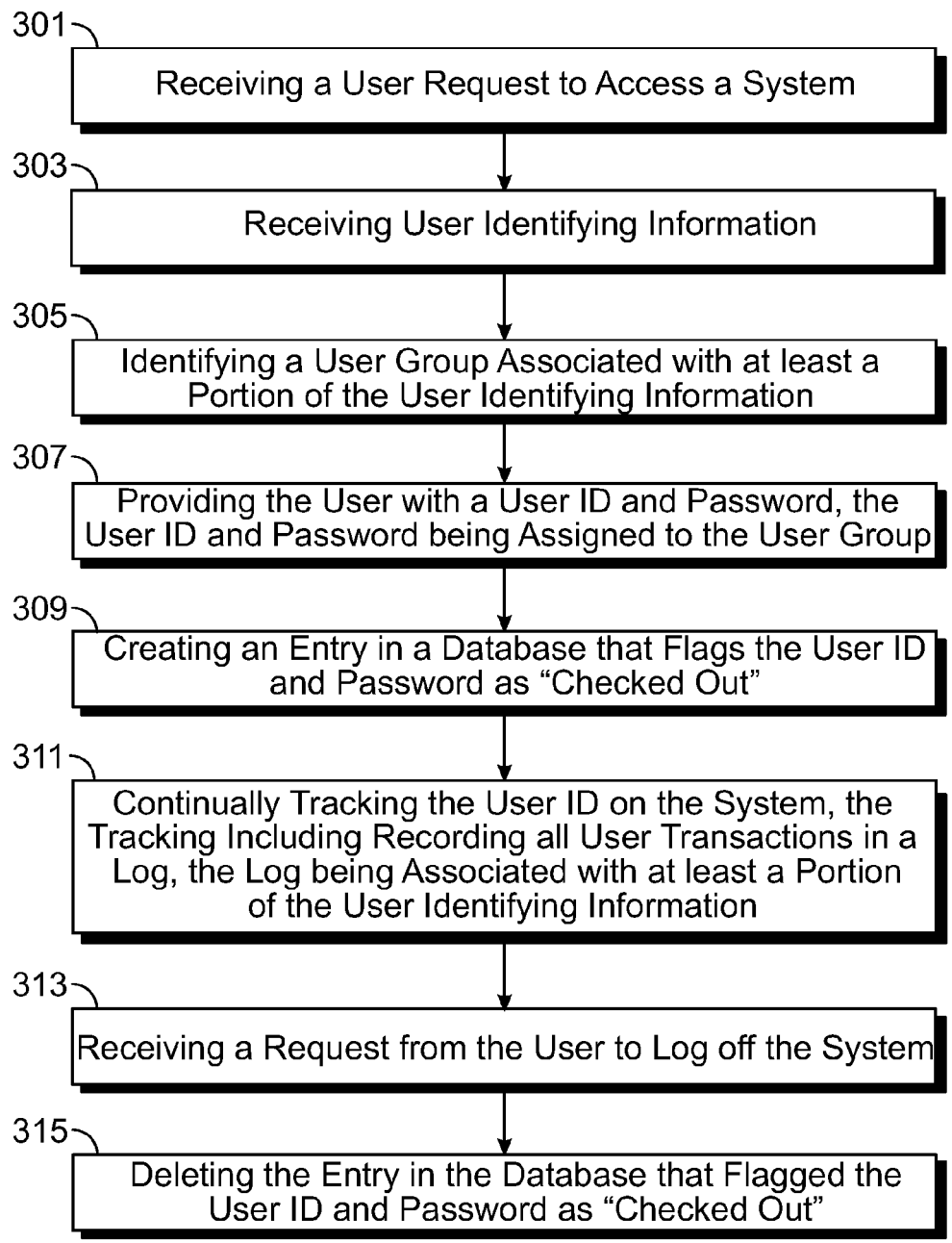
FIG. 3 shows a process in accordance with the invention.

FIG. 3 shows an illustrative process in accordance with the invention. At step 301, the process may include receiving a user request to access a system. At step 303, the process may include receiving user-identifying information. At step 305, the process may include identifying a user group including at least a portion of user-identifying information.

The process may include step 307. At step 307, the process may include providing the user with a user ID and password. The user ID and password may be a user ID and password assigned to the user group. For example, the user ID and password may be stored in a database and associated with the user group.

At step 309, the process may include creating an entry in a database that flags the user ID and password as being checked out. At step 311, the process may include continually tracking the user ID on the system. The continuous tracking may include recording all user ID transactions in a log. The transactions may be associated with at least a portion of the user-identifying information.

At step 313, the process may include receiving a request from the user to log off the system. The process may include step 315. At step 315, the process may include deleting an entry from the database that flagged the user ID and password as being checked out.

Figure 4:
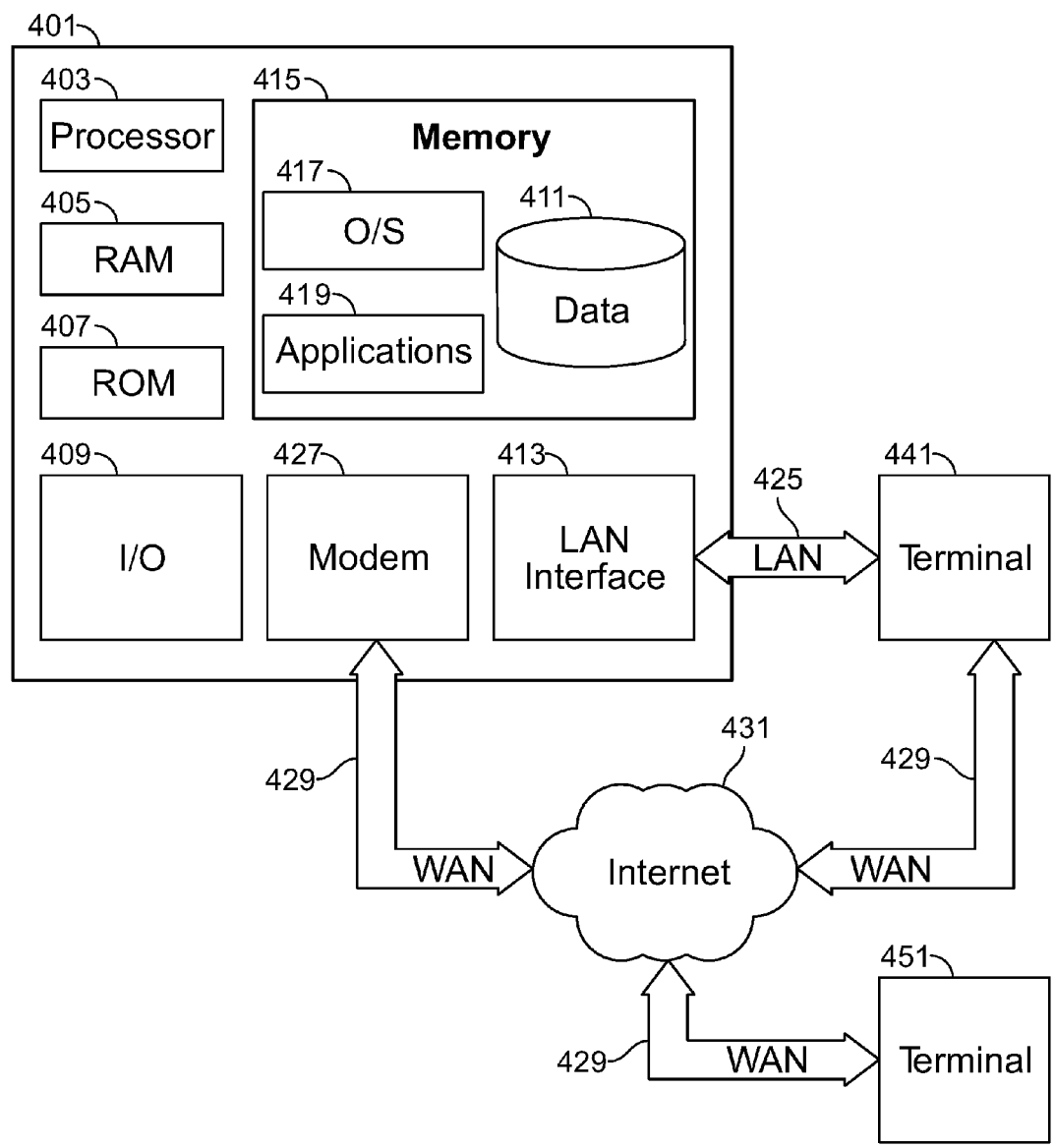
FIG. 4 shows apparatus for use with the systems and methods in accordance with the invention.

FIG. 4 is a block diagram that illustrates computing device 401 (alternately referred to herein as a "server") that may be used to execute one or more processes and methods in accordance with illustrative embodiments of the invention. The computer server 401 may have a processor 403 for controlling overall operation of the server and its associated components, including RAM 405, ROM 407, input/output module 409, and memory 415.

Input/output ("I/O") module 409 may include a microphone, keypad, touch screen, and/or stylus through which a user of server 401 may provide input, and may also include one or more of a speaker for providing audio output and a video display device for providing textual, audiovisual and/or graphical output. Software may be stored within memory 415 and/or storage to provide instructions to processor 404 for enabling server 401 to perform various functions. For example, memory 415 may store software used by server 401, such as an operating system 417, application programs 419, and an associated database 411. Alternately, some or all of server 401 computer executable instructions may be embodied in hardware or firmware (not shown). Database 411 may provide storage for the GUI. Database 411 may provide storage for the CAD. For example, database 411 may store information input into the GUI. Database 411 may provide storage for the access database, the usage database, and for storing one or more user transaction logs.

Server 401 may operate in a networked environment supporting connections to one or more remote computers, such as terminals 441 and 451. Terminals 441 and 451 may be personal computers or servers that include many or all of the elements described above relative to server 401. The network connections depicted in FIG. 4 include a local area network (LAN) 425 and a wide area network (WAN) 429, but may also include other networks. When used in a LAN networking environment, computer 401 is connected to LAN 425 through a network interface or adapter 413. When used in a WAN networking environment, server 401 may include a modem 427 or other means for establishing communications over WAN 429, such as Internet 431. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages or screens via the World Wide Web from a web-based server. Any of various conventional web browsers can be used to display and manipulate data on web pages.

Additionally, application program 419, which may be used by server 401, may include computer executable instructions for invoking user functionality related to communication, such as email, short message service (SMS), and voice input and speech recognition applications.

Computing device 401 and/or terminals 441 or 451 may also be mobile terminals including various other components, such as a battery, speaker, and antennas (not shown).

A terminal such as 441 or 451 may be used by a user of the system to input user-identifying information, a user request to access a system, a user team identifier, or any other suitable information. Information input into the GUI may be stored in memory 415. The input information may be processed by an application such as one of applications 419.

Figure 5:
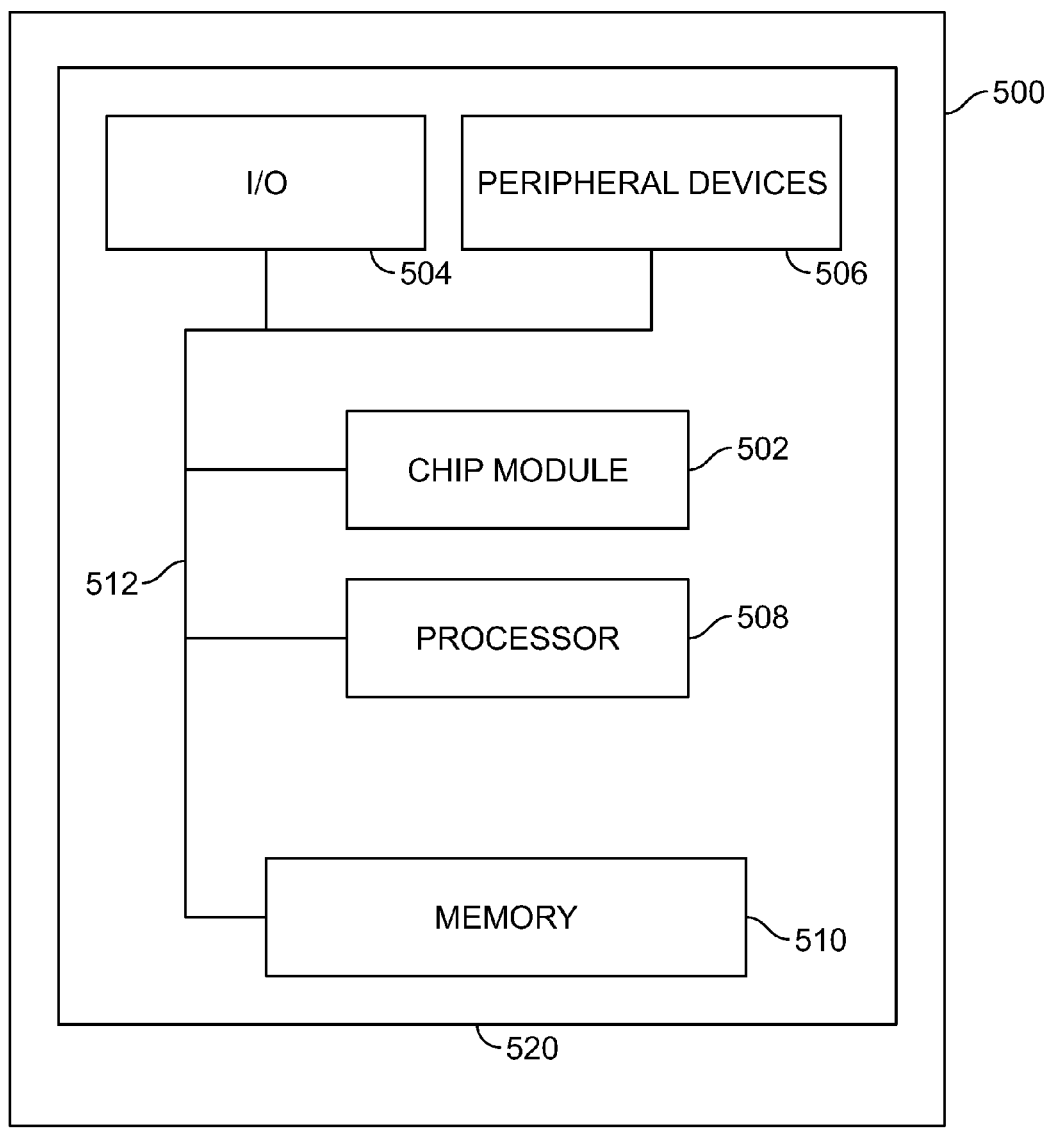
FIG. 5 shows additional apparatus for use with the systems and methods in accordance with the invention.

FIG. 5 shows an illustrative apparatus that may be configured in accordance with the principles of the invention.

FIG. 5 shows illustrative apparatus 500. Apparatus 500 may be a computing machine. Apparatus 500 may be included in apparatus shown in FIG. 4. Apparatus 500 may include chip module 502, which may include one or more integrated circuits, and which may include logic configured to perform any other suitable logical operations.

Apparatus 500 may include one or more of the following components: I/O circuitry 504, which may include the transmitter device and the receiver device and may interface with fiber optic cable, coaxial cable, telephone lines, wireless devices, PHY layer hardware, a keypad/display control device or any other suitable encoded media or devices; peripheral devices 506, which may include counter timers, real-time timers, power-on reset generators or any other suitable peripheral devices; logical processing device ("processor") 508, which may compute data structural information, structural parameters of the data, quantify indices; and machine-readable memory 510.

Machine-readable memory 510 may be configured to store in machine-readable data structures information such as user IDS, user passwords, user logs, and any other suitable information or data structures.

Components 502, 504, 506, 508 and 510 may be coupled together by a system bus or other interconnections 512 and may be present on one or more circuit boards such as 520. In some embodiments, the components may be integrated into a single silicon-based chip.

It will be appreciated that software components including programs and data may, if desired, be implemented in ROM (read only memory) form, including CD-ROMs, EPROMs and EEPROMs, or may be stored in any other suitable computer-readable medium such as but not limited to discs of various kinds, cards of various kinds and RAMs. Components described herein as software may, alternatively and/or additionally, be implemented wholly or partly in hardware, if desired, using conventional techniques.

Various signals representing information described herein may be transferred between a source and a destination in the form of electromagnetic waves traveling through signal-conducting encoded media such as metal wires, optical fibers, and/or wireless transmission encoded media (e.g., air and/or space).

Apparatus 500 may operate in a networked environment supporting connections to one or more remote computers via a local area network (LAN), a wide area network (WAN), or other suitable networks. When used in a LAN networking environment, apparatus 500 may be connected to the LAN through a network interface or adapter in I/O circuitry 504. When used in a WAN networking environment, apparatus 500 may include a modem or other means for establishing communications over the WAN. It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to operate processor 508, for example over the Internet.

Apparatus 500 may be included in numerous general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, tablets, programmable consumer electronics, network PCs, minicomputers, mainframe computers, distributed computing environments that include any of the above systems or devices, and the like.

Thus, systems and methods for enabling enhanced accountability for user system transactions have been provided. Persons skilled in the art will appreciate that the present invention can be practiced by other than the described embodiments, which are presented for purposes of illustration rather than of limitation.

What is claimed is:

1. An article of manufacture comprising a computer usable device having computer readable program code embodied therein for enhancing group access accountability, the computer readable program code in said article of manufacture comprising:
   computer readable program code for receiving a request from a user to access a system;
   computer readable program code for receiving user-identifying information associated with the user;
   computer readable program code for querying a database to retrieve a group ID number associated with at least a portion of the user-identifying information;
   computer readable program code for querying the database to retrieve access permissions associated with the group ID number;
   computer readable program code for querying the database to retrieve a user ID and password associated with the group ID number, the user ID and password being selected from a group of usernames and passwords associated with the group ID number;
   computer readable program code for flagging the user ID and password with a flag, the flag indicating that the user ID and password are in use;
   computer readable program code for transmitting the user ID and password to the user;
   computer readable program code for, after receiving log-in information including the user ID and password, storing all transactions executed by the user ID in a log, the log being associated with the user-identifying information;
   computer readable program code for continuously comparing the transactions to the access permissions associated with the group ID number;
   computer readable program code for continuously comparing the transactions to know malicious usage patterns from a time that the log-in information is received until a time that a log-out request is received;
   computer readable program code for receiving the log-out request from the user ID; and
   computer readable program code for deleting the flag from the user ID and password in response to receiving the log-out request.

2. The article of manufacture of claim 1, further comprising, computer readable program code for receiving the user-identifying information including a username and a user password.

3. The article of manufacture of claim 1 further comprising computer readable program code for retrieving access permissions associated with the group ID number and identifying a server and one of the seven Open Systems Interconnection model layers of the server.

4. The article of manufacture of claim 1 further comprising computer readable program code for retrieving access permissions associated with the group ID number and identifying a firewall and one of the seven Open Systems Interconnection model layers of the firewall.

5. The article of manufacture of claim 1 further comprising computer readable program code for retrieving access permissions associated with the group ID number and identifying a network and one of the seven Open Systems Interconnection model layers of the network.

6. The article of manufacture of claim 1 further comprising computer readable program code for automatically terminating the user ID's authorized access in the event that the log includes a transaction identical to one of the known malicious usage patterns.

7. The article of manufacture of claim 1 further comprising computer readable program code for automatically terminating the user ID's authorized access in the event that the log includes a transaction requesting access permissions outside the access permissions associated with the group ID number.

8. The article of manufacture of claim 1 farther comprising computer readable program code for retrieving traversing rules associated with one or more identified security groups.

9. The article of manufacture of claim 1 farther comprising computer readable program code for generating an authorization request to a systems manager prior to transmitting the user ID and password to the user.

* * * * *